Patented Mar. 25, 1952

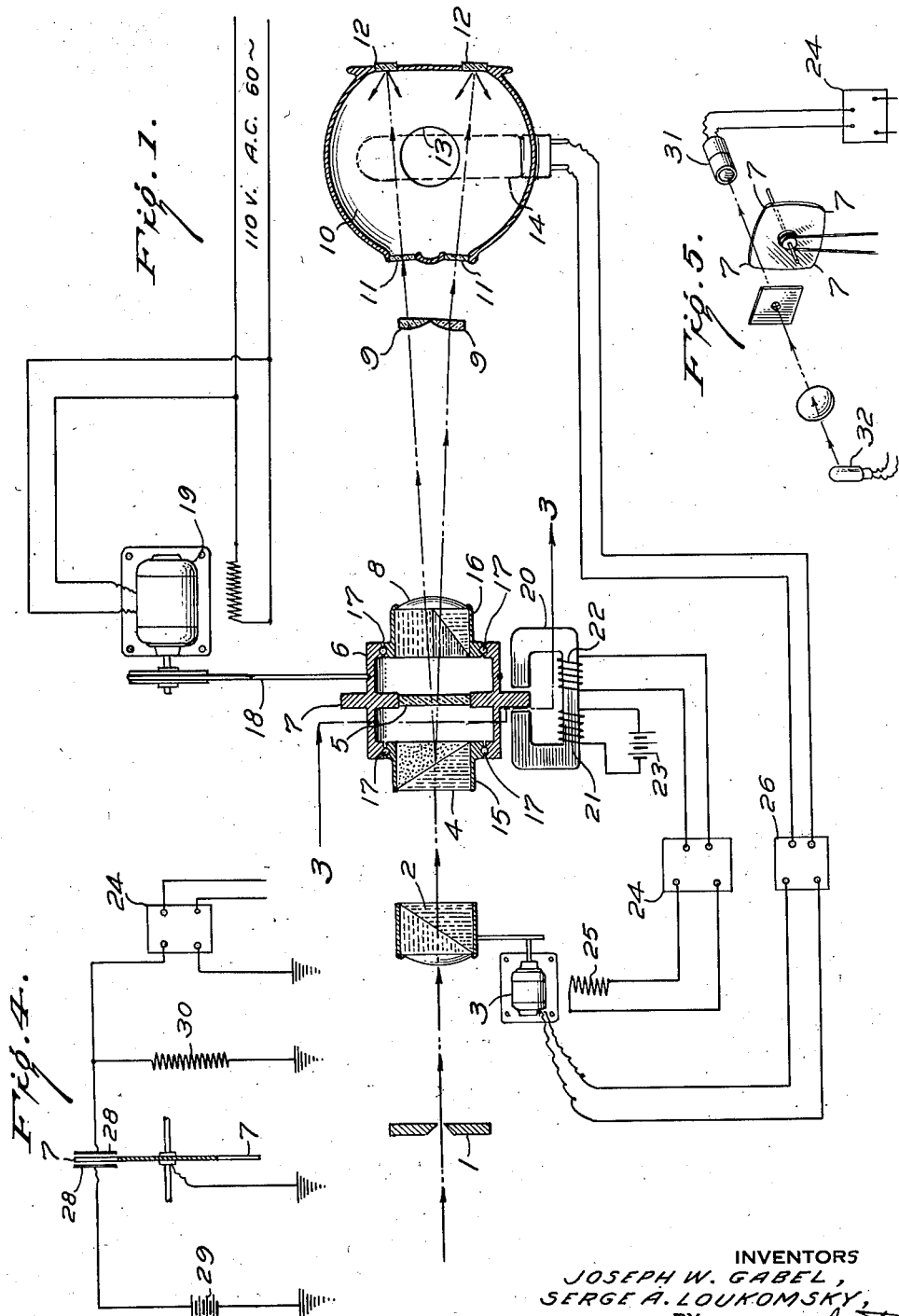

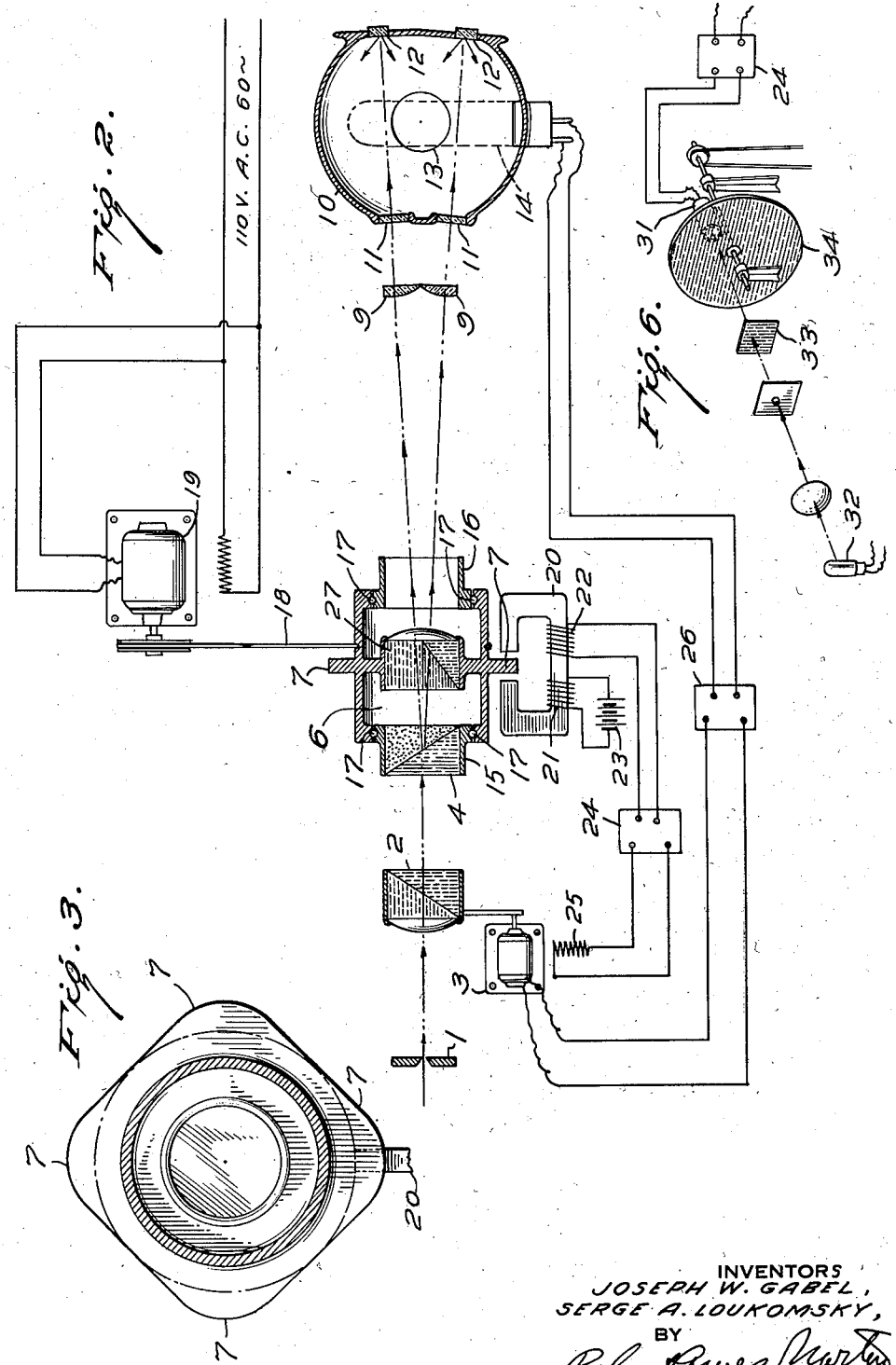

2,590,693

UNITED STATES PATENT OFFICE 2,590,693

REFERENCE SIGNAL GENERATOR FOR FLICKERING BEAM PHOTOMETERS

Joseph W. Gabel, Sugar Grove, Ohio, and Serge A. Loukomsky, North Plainfield, N. J., assignors to American Cyanamid Company, New York, N. Y., a corporation of Maine Application March 31, 1950, Serial No. 153,268

5 Claims. (Cl. 88—14)

This invention relates to a reference signal generator for flickering beam photometers.

Many photometers utilize a plurality of flickering beams, photometering being effected by varying the intensity of one of the beams or by varying the relative intensity of the two beams. Automatic instruments of the null type integrate the light from the two flickering beams of controlled relative intensity, the integrating device being provided with photoelectric means, the output of which at flicker frequency is amplified by a high-gain vacuum tube amplifier. The amplified output then actuates an electric motor which moves the photometering device, the motor constituting a sharply tuned device responsive only to alternating current flicker frequency. Unbalance in the two beams results in pulsation of the integrated light at flicker frequency in phase with the stronger beam, and photometering is effected by varying the relative strength of the beams until balance is effected.

Various types of flickering and photometering have been used in different photometric instruments in the past. Some of the early designs, which are still extensively used in infrared photometric instruments, flicker the beam by mechanical means such as suitable rotating shutters. Photometering is then effected by varying a diaphragm of one or both of the beams.

For use in the visible light range instruments effecting flickering and photometering by polarizing means are preferred and the simplicity and accuracy of these devices has almost driven mechanical flickering out of the field of visual light photometry. Polarizing instruments often have to be employed with integrating devices of extremely low efficiency. Unusually high-gain amplification is then needed which accentuates the problem solved by the present invention. Therefore, further discussion of the invention and the problems it solves will be in terms of polarized flickering-beam photometers and spectrophotometers, such as the one described in the patent to Pineo No. 2,107,836, referring to other types of flickering only where the adaptation of the present invention thereto requires modification. It should be understood that what is stated with respect to the problems and solution applies to any type of flickering and photometering mechanism.

Essentially the problem of a stable and reliable instrument involves elimination of interference by amplified spurious signals. Most flickering devices are operated by synchronous motors which may be considered for the remainder of the discussion of the present invention as operated from a typical 60-cycle A. C. line. Usually this will result in a flicker frequency of 60 cycles and the field of the motor actuating the photometering devices is then fed from the same 60-cycle source. Inasmuch as the high-gain flicker-frequency amplifier for practical purposes is operated from the same 60-cycle source, the problem of eliminating 60-cycle pick-up by shielding and filtering is quite serious.

According to the present invention the rotating flickering device is operated at a speed to produce a flicker frequency differing sufficiently from line frequency, usually 60 cycles, so that it does not form strong beat notes with the line frequency or its harmonics. This different frequency is easily obtained by driving the flicker mechanism from a synchronous motor through suitable gearing or belt drives. The rotating flicker mechanism carries elements such as cam-like lobes which change the electrical characteristics of a circuit to produce therein a flicker-frequency signal preferably, through not necessarily, of sinusoidal nature. The flicker frequency of the alternating current is then amplified in an audio-frequency amplifier and impressed on the field of the motor actuating a photometering device. This motor is, therefore, always responsive to the exact flicker frequency of the beams but since this frequency differs from that of the line, spurious 60-cycle signals do not affect the operation of the machine and the shielding problems of the high-gain flicker-frequency amplifier are enormously simplified. The elements generating the flicker-frequency signal may act directly on an electric circuit, or may produce optical changes which are transformed into an electric signal by photoelectric means. The first type of device is somewhat simpler and is preferred. Two typical examples are reluctance generators in which the flicker mechanism carries an element provided with cam-like lobes of ferromagnetic material moving through the air gap of a signal generator; or grounded metallic lobes passing between the plates of a condenser in a suitable signal circuit.

It is necessary to maintain the flicker frequency fairly constant, within half a cycle, in order to permit the use of tuned amplifiers which will minimize low frequency hunting. This necessity for reasonable good frequency control presents no problem as the ordinary synchronous motor used for driving the generating elements has frequency stability much greater than half a cycle.

Often an improvement in instrumental operation is only obtainable at increased cost. In the case of the present invention, however, the improved stability and reliability of the device is obtained with little additional cost in amplifier because the few additional elements used are both rugged and cheap. This is more than offset by saving in cost of power supply, elimination of D. C. tube heating in some stages, etc. The advantages of the present invention are, therefore, obtained without offsetting disadvantages.

The invention will be described in greater detail in conjunction with typical polarizing light flickering beam spectrophotometers. As the optics of the instruments are substantially unchanged by the present invention, only the portion of the structure involving the present invention will be shown. It is an advantage of the invention that it is not necessary to redesign the optics of any flickering beam photometric apparatus in order to incorporate the advantages of the present invention. The description will be in conjunction with typical polarized light flickering beam spectrophotometers in conjunction with the drawings, in which:

Fig. 1 is a diagrammatic representation of the flickering beam spectrophotometer using retardation plate flickering;

Fig. 2 is a diagrammatic representation of a flickering beam spectrophotometer using Rochon prism flickering;

Fig. 3 is a section through Fig. 1 along the line 3—3 of a generating cam;

Fig. 4 is a diagrammatic representation of a different form of signal generator;

Fig. 5 is a semi-diagrammatic representation of a photoelectric signal generator; and Fig. 6 is a semi-diagrammatic representation of a modified form of photoelectric signal generator.

The spectrophotometer in Fig. 1 uses a conventional monochromator, only the exit slit 1 of which is shown. The polarized beam passes through a photometering Rochon prism 2 actuated by a photometering motor 3. The plane polarized light then strikes a Wollaston prism 4 where it is split into two diverging beams plane polarized at right angles to each other. For equality of flickering beams the Rochon prism is at 45° to the Wollaston prism; however, for simplicity, it is shown at an extreme position. The two plane polarized beams from the Wollaston prism pass through a retardation plate 5 which may be a half-wave plate or a multiple retardation plate. This is mounted in a rotating sleeve 6 provided with four lobes 7. The beams after leaving the retardation plate then pass through a stationary Rochon prism 8 at 45° to the Wollaston prism 4. Beams from the stationary Rochon prism, which are flickering in opposite phase, then pass through decentering lenses 9 and into an integrating sphere 10 through two windows 11 striking two sample holders 12 on the rear face of the sphere. An opening 13 in the sphere permits integrated light to strike a phototube 14.

Fig. 1 shows a simple mechanical mounting for the rotating retardation plate. The Wollaston prism 4 and the stationary Rochon 8 are mounted in rigid sleeves 15 and 16 respectively, on which the rotating sleeve 6 turns on two ball bearings 17. The sleeve is driven by a belt 18 from a motor 19 fed from an ordinary 110-volt alternating current line. The drive ratio of the motor pulley and the sleeve is so shown that the flicker frequency is 79 cycles. This particular frequency is not critical and is merely typical of a suitable frequency which does not form interfering beats with 60 cycles or its harmonics.

The lobes 7 pass through the air gap of a magnet 20 which is provided with two windings 21 and 22. The former is energized by direct current shown diagrammatically as coming from a battery 23. The other winding is connected to the input of an audio-frequency amplifier 24, the output of which feeds the field 25 of the photometering motor 3, the frequency being determined by the lobes 7 and, in the illustrated case, being 79 cycles.

The phototube 14 is connected into the input of a very high-gain audio-frequency amplifier 26 the output of which leads to the armature of the photometering motor 3. The operation of the spectrophotometer is conventional; for example, a standard is placed in one sample holder 12 and the sample, the reflectance of which is to be measured, is placed in the other. Successive very narrow bands of light through the spectrum are emitted through the monochromator through the exit slit 1 and are transformed into two beams pulsating from maximum to minimum at opposite phase at flicker frequency, one beam striking the standard and the other the sample. If the two beams are of equal intensity, when the photometering prism 2 is at 45° to the Wollaston prism 4, and the reflectance of sample to standard at any particular wavelength is the same, there will be no pulsation at flicker frequency of the integrated light in the sphere 10. Any difference in reflectance of sample and standard will cause the integrated light in the sphere to pulsate at flicker frequency in phase with the stronger reflecting beam. Phototube 14 transforms this pulsating light into a flicker frequency signal which is amplified and impressed in proper phase on the armature of the photometering motor 3. The latter rotates, turning the photometering prism 2 in a direction to weaken the more strongly reflected beam. As long as there is any unbalance the motor will continue to turn until there is no pulsation of integrated light in the sphere, at which time the flicker frequency signal from the phototube ceases and the motor stops. As the light from the monochromator passes through the spectrum, the relative reflectance of the sample and standard changes, and the photometering motor will turn the photometering prism so as to restore the balance of light in the integrating sphere.

The movement of the motor 3 is used to drive a recorder or indicating mechanism in the conventional manner. It will be seen that the operation of the spectrophotometer is not changed in the slightest by incorporation of the present invention, in fact the invention may be incorporated into existing spectrophotometers with minor mechanical changes in the flickering mechanism to provide for a different rotating speed and the reluctance generating lobes. The amplifier 26, however, may be of simpler design than one operating at 60 cycles, and shielding requirements and ripple requirements on the power supply are much less severe. Increased reliability or, if desired, lower cost, of the amplifier is obtained without changing the optical accuracy of the instrument in any way. The only new elements required are the reluctance generator and its simple, cheap audio-frequency amplifier.

Fig. 2 shows a flickering beam spectrophotometer which is substantially the same as that of Fig. 1, the same elements bearing the same reference characters, but instead of using a retardation plate 6 and stationary Rochon prism 8 as the flickering means, a Rochon prism 27 is mounted in the rotating sleeve 6. It should be noted that the rotational speed of a Rochon prism is twice that of a retardation plate for the same flicker frequency. The operation of the instrument is the same as in Fig. 1, the known advantages and disadvantages of retardation plate and Rochon flickering being obtained, for, as stated above, the present invention does not change the optical operation of the system in the slightest.

Fig. 3 shows a plan view of the four lobes 7. It will be seen that the profile of these lobes is symmetrical and is so designed as to produce a smooth sinusoidal alternating current in the input to the amplifier 24. Rochon flickering means, where the rotational speed is twice that of retardation plate flickering, requires only two lobes instead of four.

Fig. 4 illustrates digrammatically a modified form of signal generator, the same parts bearing the same reference numerals. The lobes 7, which are grounded, may be of any metal and need not be ferromagnetic. They pass between the plates 28 of a condenser in a circuit including a battery 29, or other source of direct current, and a resistance 30. A variation in capacity results as the lobes pass between the fixed condenser plates, and an A. C. signal of flicker frequency is therefore developed across the resistance 30. This signal is amplified by the audio-frequency amplifier 24 in the same manner as in the preceding figures.

Fig. 5 illustrates a somewhat different type of signal generator. Here a beam of light is produced by the light source 32 and its intensity is varied as lobes 7 pass through the beam changing its area. A photoelectric device 31 receives the varying radiation and transforms it into electrical energy which, in turn, is amplified by the amplifier 24.

Fig. 6 shows a modified photoelectric signal generator. Here a light beam from the source 32 passes through a plane polarizing element, shown as a sheet of polarizing material 33. The rotating element carries a second sheet of polarizing material 34 and, as a result, the light beam is flickered from maximum to minimum twice in each revolution. This modification produces a very pure sine wave signal, but it is applicable only to spectrophotometers using Rochon flickering which also produce two flicker cycles per revolution. Half-wave plate flickering, which produces four cycles per revolution, would require rotating the polarizing element at twice the speed of the rotation plate, which, while feasible, adds so much additional complication that this material modification is not as suitable as that described in Fig. 5.

The device of the present invention has been illustrated with conventional flickering-beam spectrophotometers. It is, of course, applicable to any type of flickering-beam instrument where an equal flicker-frequency electrical signal is required. Thus, for example, the invention may be used in the more elaborate spectrophotometers described in the patents to Stearns and Buc, Nos. 2,430,833, 2,430,834, 2,438,422, 2,471,249, 2,435,175, 2,435,176, 2,471,248, or any other instrument. In each case there is no change in the optics.

We claim:

1. An improved flickering-beam photometer comprising in combination means for producing two beams of light flickering in opposite phase, a movable photometering element capable of varying the relative intensities of the flickering beams, a light-integrating device positioned to receive the flickering beams, photoelectric means for transforming the integrated light into an electrical signal, means for holding sample and standard respectively in the two flickering beams, electrically driven means for moving the photometering element, a high-gain flicker-frequency amplifier having an alternating current power source having its input connected to the photoelectric means and its output to the electrically driven means, the means for producing the flickering beams including a rotating element having portions thereof moving through an element in a signal generator capable of producing an alternating electric signal at flicker frequency, a flicker-frequency amplifier, connecting means from the signal generator to the input of the amplifier, means connecting the output of said amplifier to the electric driving means of the photometering element, and means for rotating the rotating element to produce a flicker frequency differing from that of the frequency of the power source for the flicker frequency amplifier and its harmonics, the output of the high-gain amplifier being in phase to cause the rotation of the electric driving means of the photometering element in a direction to eliminate flicker-frequency light fluctuations in the integrating means.

2. A flickering-beam spectrophotometer according to claim 1 in which the electrically driven means is an electric motor having an armature and field, the photometering element is a rotatable polarizing element, means are provided in the emergent beams from the polarizing element to split the beam into two divergent beams plane polarized at right angles to each other, one winding of the electric motor driving the photometering polarizing element being connected to the output of one of the flicker-frequency amplifiers, and the field to the other.

3. A spectrophotometer according to claim 2 in which the rotating element in the means for producing the flickering beams is provided with projections of material of magnetic susceptibility, and the signal generator comprises a magnet provided with a gap positioned so that the projections succesively pass therethrough, and includes a coil on said magnet in the input circuit of the audio-frequency amplifier.

4. A spectrophotometer according to claim 3 in which the rotating element in the means for producing two flickering beams is a rotating Rochon prism, and the number of projections of magnetically susceptible material thereon being two.

5. A spectrophotometer according to claim 3 in which the flickering means comprises a rotating half-wave plate and a fixed polarizing prism, the rotating element being provided with four projections of magnetically susceptible material.

JOSEPH W. GABEL.
SERGE A. LOUKOMSKY.

REFERENCES CITED

The following references are of record in the file of this patent:

UNITED STATES PATENTS

| Number | Name | Date |
|---|---|---|
| 2,107,836 | Pineo | Feb. 8, 1938 |
| 2,502,319 | Golay | Mar. 28, 1950 |